Patented Jan. 30, 1934

1,945,307

UNITED STATES PATENT OFFICE 1,945,307

POLYMERIZATION OF ESTERS OF ETHYLENE DICARBOXYLIC ACIDS

Harry B. Dykstra, Wilmington, Del., assignor to E. I. du Pont de Nemours & Company, Wilmington, Del., a corporation of Delaware No Drawing. Application June 3, 1930
Serial No. 459,108

14 Claims. (Cl. 134—26)

This invention relates to new compositions of matter. More particularly it relates to new compositions of matter formed by the polymerization of olefine dicarboxylic acid derivatives alone or in the presence of other materials. The invention more particularly relates to the adaptation of these resinous polymerized products to the uses to which such resinous products are usually put, as for instance, their adaptation to coating compositions and plastics.

In my study of the polymerization of ethylene derivatives I have found it to be generally true that in those derivatives in which one hydrogen atom in the ethylene molecule is replaced by a negative group, polymerization readily takes place, whereas those derivatives in which there is a positive substituent, or a negative group attached to each carbon atom, do not polymerize readily. I have found that the compositions of matter which form the subject of this invention are exceptions to this general rule in that, although diethyl fumarate has a symmetrical structure, (a negative group attached to each carbon atom), resulting from the replacement by identical groups of one hydrogen on each carbon atom, it can easily be polymerized.

Inasmuch as fumaric and maleic acids are the only olefine dicarboxylic acids which are commercially available, the invention will be described in particular reference thereto, although it is to be understood that the invention is not limited to derivatives of these acids, but applies equally to derivatives of other olefine dicarboxylic acids such as citraconic acid (otherwise known as methyl maleic acid) and mesaconic acid (otherwise methyl fumaric acid). The structure of these compounds is probably the following:

citraconic acid (methyl maleic acid)     mesaconic acid (methyl fumaric acid)

An object of my invention is the preparation of new compositions of matter from the derivatives of olefine dicarboxylic acids, and from mixtures of olefine dicarboxylic acid derivatives with other materials. Another object is the polymerization of derivatives of olefine dicarboxylic acids, and of mixtures of derivatives of olefine dicarboxylic acids. A further object is the polymerization of derivatives of olefine dicarboxylic acids, and of ethylene dicarboxylic acids in the presence of other polymerizable or film-forming constituents. A still further object is the use of these materials in coating and plastic compositions.

These objects are accomplished in general by polymerizing the selected material either by heat or by exposure to actinic light, or both, during which polymerization a catalyst may or may not be present.

I have discovered that diethyl maleate generally polymerizes to what appears to be a liquid polymer. Diethyl fumarate, however, polymerizes, when heated, to a colorless resin which has excellent characteristics. When heated in toluene solution with benzoyl peroxide, it also yields a resinous product having excellent color. Attempts to polymerize it in light were also successful and yielded a satisfactory product. It has been found that triethyl lead acetate catalyzes both the heat and the light polymerization of this substance.

Dimethyl fumarate, when subjected to the treatment described above in connection with diethyl fumarate, yields colorless resins resembling polymerized diethyl fumarate in physical and chemical properties.

Polymerized diethyl fumarate and polymerized dimethyl fumarate have been found to be soluble in ethyl alcohol, acetone, ethyl acetate, butyl acetate, benzene, toluene, xylene, high-flash aromatic naphtha, and other suitable solvents. They are insoluble in aliphatic hydrocarbons.

When solutions of these resins were made up either with or without the addition of plasticizers, pigments, etc., they yielded coating compositions having good color stability and excellent characteristics. Films which had been made from polymers prepared by heat in the presence of benzoyl peroxide stayed tacky for several days, but this tackiness could be overcome by heating to 150° C. for twenty-four hours. Films from the light polymerized substances became tack-free after heating at 65° C. for one hour.

In polymerizing these derivatives in the presence of other polymerizable materials, such as vinyl derivatives, products were obtained whose properties were superior to the properties of the resins formed by mechanically mixing the individual polymers of the several substances. Indeed, it was noticed that, in general, mixed polymers exhibited incompatibility except when prepared in the presence of each other.

The following examples are illustrative of my invention and are not to be deemed in any sense limitative:—

Example I

A solution of four grams benzoyl peroxide in two hundred grams of diethyl fumarate was heated on a water bath for seven hours. The mixture, which became viscous as a result of polymerization, was subjected to distillation under reduced pressure to remove unchanged diethyl fumarate. This left as a residue 179 grams of soft, colorless resin.

Example II

A mixture of fifty grams diethyl fumarate, fifty grams toluene, and one gram benzoyl peroxide was refluxed for five hours. The toluene and unchanged diethyl fumarate were then removed by distillation under reduced pressure which left as a residue about ten grams of soft, colorless resin.

Example III

Fifty grams of diethyl maleate and one gram benzoyl peroxide were heated on the water bath for five hours and then subjected to distillation at 15 mm. After the removal of the unchanged diethyl maleate, by distillation, about five grams of dark, colorless liquid remained which did not distill even at 200° C./15 mm. This residue differed from diethyl maleate in being insoluble in gasoline. It was probably a liquid polymer of diethyl maleate.

Example IV

A mixture of fifty grams diethyl fumarate and one gram triethyl lead acetate was placed in the sunlight for a few days. When the viscous mixture which was formed in this way was distilled as in the preceding experiments, fourteen grams of clear resin was obtained.

Example V

A solution of five grams vinyl chloride polymer and twenty grams diethyl fumarate was heated on the water bath for five hours. The mixture was then poured, with stirring, into gasoline. This caused fifteen grams of resin to separate as a precipitate.

Example VI

A mixture of 100 g. dimethyl fumarate and 2 g. benzoyl peroxide was heated at 110–120° C. for 5 hours. The unpolymerized dimethyl fumarate was removed from the reaction mixture by distillation under reduced pressure, leaving 68 g. of polymerized dimethyl fumarate as a residue. The polymer was practically colorless and resembled polymerized diethyl fumarate in solubility and in film properties.

Example VII

A mixture of 50 g. diethyl fumarate, 25 g. vinyl acetate, and 1.4 g. benzoyl peroxide was heated at 70–100° C. for 5 hours. The unpolymerized esters were removed by distillation under reduced pressure, leaving 59 g. of resinous product. A solution of this resin, which was probably an interpolymer of diethyl fumarate and vinyl acetate, gave films which were perfectly clear. These films dried much more rapidly than those of polymerized diethyl fumarate and were exceedingly tough. Films flowed from solutions containing polymerized diethyl fumarate and polymerized vinyl acetate prepared separately, were distinctly cloudy and did not have the desirable properties of products prepared by the mutual polymerization of diethyl fumarate and vinyl acetate.

Example VIII

A solution containing 15 g. diethyl fumarate, 45 g. styrene, 55 g. ethyl benzene, and 0.5 benzoyl peroxide was heated to 120° C. and then the source of heat was removed. A vigorous reaction occurred so that the reaction mixture remained at a temperature above 120° C. for some time. When the reaction temperature fell to 105° C., a small amount of benzoyl peroxide was added and the mixture was heated at 120° C. for several hours. On steam distilling the reaction mixture, 60 g. of resinous product was obtained. Films of this product were perfectly clear, whereas those flowed from solutions prepared from mechanical mixtures of polymerized diethyl fumarate and polymerized styrene showed distinct incompatibility.

The following are examples of coating compositions formed from resins prepared according to my invention:—

Example IX

| | Parts |
|---|---|
| Polymerized diethyl fumarate (product of Example IV) | 10 |
| Ethyl acetate | 10 |
| Butyl acetate | 5 |

This lacquer gave clear films which became tacky-free after heating at 65° C. for about an hour.

Example X

| | Parts |
|---|---|
| Product from Example V | 10 |
| Ethyl acetate | 5 |
| Toluene | 5 |
| Xylene | 5 |

This lacquer gave films which became tacky-free within one and one-half hours drying at 25°–30° C. The films were harder than those obtained from the lacquers given in Example IX.

Example XI

| | Parts |
|---|---|
| Product from Example VII | 20 |
| Ethyl acetate | 15 |
| Butyl acetate | 10 |
| Xylene | 5 |

Films of this lacquer became tacky-free in about six hours when dried at 25°–30° C. Hard and extremely tough films were obtained by baking films of this lacquer at 110° C. for two hours.

Among the advantages of my invention are the preparation of new compositions of matter, and the preparation of coating compositions and plastics therefrom. Other advantages will be apparent from the reading of the specification.

As many apparently widely different embodiments of this invention may be made without departing from the spirit and scope thereof, it is to be understood that I do not limit myself to the specific embodiments thereof except as defined in the appended claims.

I claim:

1. A new composition of matter derived from the interpolymerization of an ester of an olefine dicarboxylic acid and another polymerizable substance of the class consisting of vinyl esters and styrene, said dicarboxylic acid being selected from the class consisting of fumaric, maleic, citraconic and mesaconic acids.

2. A new composition of matter derived from the polymerization of an ester of an olefine dicarboxylic acid in the presence of a film-forming material of the class consisting of vinyl esters and styrene, said dicarboxylic acid being selected from the class consisting of fumaric and maleic acids.

3. The product resulting from the interpolymerization of diethyl fumarate with vinyl acetate.

4. The method of interpolymerizing diethyl fumarate and vinyl acetate consisting in heating a mixture of them in the presence of benzoyl peroxide.

5. A coating composition comprising polymerized diethyl fumarate.

6. A process of making a film-forming interpolymer which comprises polymerizing an ester of an ethylene dicarboxylic acid in the presence of a film-forming material of the class consisting of vinyl esters and styrene, said dicarboxylic acid being selected from the class consisting of fumaric, maleic, citraconic and mesaconic acids.

7. A method of interpolymerizing an ester of an ethylene dicarboxylic acid with a film-forming material of the class consisting of vinyl esters and styrene which consists in heating said ester in the presence of said film-forming material, said dicarboxylic acid being selected from the class consisting of fumaric, maleic, citraconic and said mesaconic acids.

8. In the art of coating the step which comprises the application to the object to be coated of a film of polymerized ester of olefine dicarboxylic acid selected from the class consisting of fumaric, maleic, citraconic and mesaconic acids.

9. In the art of coating the step which comprises the application to the object to be coated of a film of polymerized ester of an ethylene dicarboxylic acid selected from the class consisting of fumaric, maleic, citraconic and mesaconic acids.

10. In the art of coating the step which comprises the application to the object to be coated of a film of polymerized diethyl fumarate.

11. In the art of coating the step which comprises the application to the object to be coated of a film of an interpolymer which is derived from the polymerization of an ester of an olefine dicarboxylic acid in the presence of a film-forming material of the class consisting of vinyl esters and styrene, said dicarboxylic acid being selected from the class consisting of fumaric, maleic, citraconic and mesaconic acids.

12. In a coating composition, a polymerized ester of an ethylene dicarboxylic acid selected from the class consisting of fumaric, maleic, citraconic and mesaconic acids.

13. The composition of matter set forth in claim 1 in which said ester is selected from the class consisting of the methyl and ethyl esters.

14. The composition set forth in claim 12 in which the said ester is selected from the class consisting of methyl and ethyl esters.

HARRY B. DYKSTRA.